(12) United States Patent
Kordunsky et al.

(10) Patent No.: US 11,512,757 B2
(45) Date of Patent: Nov. 29, 2022

(54) PRECISION VIBRATION-ISOLATION SYSTEM WITH FLOOR FEEDFORWARD ASSISTANCE

(71) Applicant: Technical Manufacturing Corporation, Peabody, MA (US)

(72) Inventors: Igor Kordunsky, Quincy, MA (US); Jeffrey L. Worthey, Waltham, MA (US); Antonio Lopes, Salem, MA (US)

(73) Assignee: Technical Manufacturing Coporation, Peabody, MA (US)

( * ) Notice: Subject to any disclaimer, the term of this patent is extended or adjusted under 35 U.S.C. 154(b) by 414 days.

(21) Appl. No.: 16/638,073

(22) PCT Filed: Aug. 15, 2018

(86) PCT No.: PCT/US2018/000146
§ 371 (c)(1),
(2) Date: Feb. 10, 2020

(87) PCT Pub. No.: WO2019/035882
PCT Pub. Date: Feb. 21, 2019

(65) Prior Publication Data
US 2020/0217386 A1    Jul. 9, 2020

Related U.S. Application Data

(60) Provisional application No. 62/545,948, filed on Aug. 15, 2017.

(51) Int. Cl.
*F16F 15/00* (2006.01)
*F16F 7/10* (2006.01)
(Continued)

(52) U.S. Cl.
CPC .......... *F16F 7/1005* (2013.01); *F16F 7/104* (2013.01); *F16F 15/002* (2013.01);
(Continued)

(58) Field of Classification Search
None
See application file for complete search history.

(56) References Cited

U.S. PATENT DOCUMENTS 4,796,873 A    1/1989  Schubert
5,265,704 A    11/1993 Landesfeind
(Continued)

FOREIGN PATENT DOCUMENTS

JP    H05-340444 A    12/1993
JP    H0854039 A      2/1996
(Continued)

OTHER PUBLICATIONS

U.S. Appl. No. 16/233,428, Kraner et al., filed Dec. 27, 2018.
(Continued)

*Primary Examiner* — Steven M Marsh
(74) *Attorney, Agent, or Firm* — Smith Baluch LLP (57) ABSTRACT

Apparatus and methods to reduce unwanted motion in precision instruments are described. An active vibration-isolation system may include a feedback loop that senses motion of an intermediate mass. In noisy environments, where the feedback loop would otherwise fail or provide inadequate isolation, feedforward control can be implemented to sense floor vibrations and reduce motion of the intermediate mass that would otherwise be induced by the floor vibrations. The feedforward control can reduce motion of the intermediate mass to a level that allows the feedback loop to operate satisfactorily.

23 Claims, 6 Drawing Sheets

(51) Int. Cl.
  *F16F 7/104* (2006.01)
  *F16F 15/02* (2006.01)
  *G05B 19/042* (2006.01)
(52) U.S. Cl.
  CPC .......... *F16F 15/022* (2013.01); *G05B 19/042* (2013.01); *F16F 2222/08* (2013.01); *F16F 2224/0208* (2013.01); *F16F 2228/066* (2013.01); *F16F 2230/18* (2013.01); *G05B 2219/21137* (2013.01); *G05B 2219/25252* (2013.01); *G05B 2219/25257* (2013.01)

(56) References Cited

U.S. PATENT DOCUMENTS

| | | | |
|---|---|---|---|
| 5,433,422 | A | 7/1995 | Ross et al. |
| 5,505,282 | A | 4/1996 | Olgac |
| 5,613,009 | A | 3/1997 | Miyazaki et al. |
| 5,645,260 | A | 7/1997 | Falangas |
| 5,660,225 | A | 8/1997 | Saffron |
| 5,660,255 | A | 8/1997 | Schubert et al. |
| 5,823,307 | A | 10/1998 | Schubert et al. |
| 5,884,736 | A | 3/1999 | Burdisso et al. |
| 5,975,508 | A | 11/1999 | Beard |
| 6,009,985 | A * | 1/2000 | Ivers ................. F16F 7/104 244/54 |
| 6,032,770 | A | 3/2000 | Alcone et al. |
| 6,193,206 | B1 | 2/2001 | Yasuda et al. |
| 6,354,576 | B1 | 3/2002 | Jacobs et al. |
| 6,752,250 | B2 | 6/2004 | Tanner |
| 6,808,051 | B2 | 10/2004 | Warmerdam |
| 7,051,588 | B1 | 5/2006 | Maltby |
| 7,571,793 | B2 | 8/2009 | Warmerdam et al. |
| 7,665,708 | B2 | 2/2010 | Stothers et al. |
| 7,726,452 | B2 | 6/2010 | Kraner |
| 7,886,317 | B2 | 2/2011 | Chang et al. |
| 8,899,393 | B2 | 12/2014 | Kraner et al. |
| 9,353,824 | B2 | 5/2016 | Kraner et al. |
| 9,665,108 | B2 | 5/2017 | Nawata |
| 10,184,539 | B2 | 1/2019 | Kraner et al. |
| 2002/0104950 | A1 | 8/2002 | Mayama |
| 2006/0119026 | A1 | 6/2006 | Ryaboy et al. |
| 2006/0272910 | A1 | 12/2006 | Kraner |
| 2007/0273074 | A1 | 11/2007 | Mizuno et al. |
| 2008/0237947 | A1 * | 10/2008 | Warmerdam ........... G03F 7/709 267/75 |
| 2009/0180092 | A1 | 7/2009 | Butler et al. |
| 2010/0030384 | A1 | 2/2010 | Kraner et al. |
| 2013/0328253 | A1 | 12/2013 | Kraner et al. |
| 2014/0021324 | A1 * | 1/2014 | Schumacher ....... G03F 7/70825 248/550 |
| 2014/0209779 | A1 | 7/2014 | Kropp et al. |
| 2015/0084249 | A1 * | 3/2015 | Kraner ................. G05B 19/404 267/140.14 |
| 2016/0091047 | A1 * | 3/2016 | Kramer ................. F16F 7/1011 267/140.14 |
| 2019/0078643 | A1 * | 3/2019 | Kraner ................. F16F 15/002 |
| 2019/0129317 | A1 * | 5/2019 | Ronde ................. G03F 7/70766 |
| 2019/0234478 | A1 | 8/2019 | Kraner et al. |
| 2020/0076288 | A1 * | 3/2020 | Nerubenko ........... F16F 7/1005 |

FOREIGN PATENT DOCUMENTS

| | | |
|---|---|---|
| JP | H08326834 A | 12/1996 |
| JP | H11-297587 A | 10/1999 |
| JP | 2000-027929 A | 1/2000 |
| JP | 2001271870 A | 10/2001 |
| JP | 2003232398 A | 8/2003 |
| JP | 2005-106272 A | 4/2005 |
| JP | 2009507359 A | 2/2009 |
| JP | 2011-530047 A | 12/2011 |
| JP | 2011530047 A | 12/2011 |
| JP | 2015518947 A | 7/2015 |
| WO | 2005121901 A1 | 12/2005 |
| WO | WO 2005/121901 A1 | 12/2005 |
| WO | WO 2010/014547 A1 | 2/2010 |
| WO | WO 2011/115488 A1 | 9/2011 |
| WO | WO-2020249622 A1 * | 12/2020 ............ F16F 7/1011 |

OTHER PUBLICATIONS

U.S. Appl. No. 16/084,772, Kraner et al., filed Sep. 13, 2018.
International Search Report and Written Opinion for International Application No. PCT/US2009/051845, dated Sep. 17, 2009.
International Search Report and Written Opinion for International Application No. PCT/US2013/043001, dated Sep. 25, 2013.
International Preliminary Report on Patentability for International Application No. PCT/US2013/043001, dated Dec. 9, 2014.
International Search Report and Written Opinion for International Application No. PCT/US2017/022532, dated Jul. 13, 2017.
International Preliminary Report on Patentability for International Application No. PCT/US2017/022532, dated Sep. 27, 2018.
International Search Report and Written Opinion for International Application No. PCT/US2018/000146, dated Dec. 14, 2018.
International Preliminary Report on Patentability for International Application No. PCT/US2018/000146, dated Feb. 27, 2020.
Office Action with translation in Japanese Application No. 2020-508508 dated Aug. 30, 2022, 5 pages.

* cited by examiner

PRECISION VIBRATION-ISOLATION SYSTEM WITH FLOOR FEEDFORWARD ASSISTANCE

CROSS REFERENCE TO RELATED APPLICATIONS

This application is a national stage filing under 35 U.S.C. § 371 of International Patent Application No. PCT/US2018/000146, filed Aug. 15, 2018, entitled "PRECISION VIBRATION-ISOLATION SYSTEM WITH FLOOR FEEDFORWARD ASSISTANCE", which claims the benefit of U.S. Provisional Application No. 62/545,948, filed Aug. 15, 2017, titled "PRECISION VIBRATION-ISOLATION SYSTEM WITH FLOOR FEEDFORWARD ASSISTANCE," each of which is hereby incorporated by reference in its entirety.

BACKGROUND

Technical Field

The technology relates to active vibration-isolation systems that reduce unwanted motion at a supported payload. In some implementations, the supported payload may be a sensitive instrument, such as an optical, atomic-force, or electron-beam microscope.

Discussion of the Related Art

Precision instruments that are used in various areas of technology (e.g., integrated circuit fabrication, metrology, various areas of microscopy, precision medical instruments etc.) benefit from isolation of ambient sources of noise that can couple unwanted motion (e.g., vibrations, impulses, etc.) into a precision instrument. One approach to vibration isolation is to mount an instrument on a platform that has passive motion dampers (e.g., an air-suspension and/or spring-suspension system with motion-damping components such as passive dampers with viscous fluid or material). In some cases, a precision instrument may need vibration isolation from external sources to levels where passive motion dampers do not provide adequate isolation. To achieve such performance, an active vibration-isolation system may be employed between a precision instrument and a base which supports the instrument. For example, an active feedback system may be used to drive actuators to oppose externally-induced motion of the precision instrument.

SUMMARY

Apparatus and methods for improving an active vibration-isolation system are described. According to some embodiments, an active vibration-isolation system comprises a feedback system that drives one or more actuators that oppose externally and/or internally-induced motion of an intermediate mass, which supports a payload such as a precision instrument. In noisy settings, the operating range of the feedback system can be exceeded by external sources of motion. To prevent overwhelming the feedback system, a vibration sensor can be mounted on a base that supports the vibration-isolation system and feedforward control provided to an actuator to drive the intermediate mass to reduce its motion and bring the system into compliance. When in compliance, the feedback system can operate satisfactorily to reduce vibrations as it normally would in a less noisy environment. By employing feedforward control as described herein, the feedback system can operate in a noisier environment than it otherwise would be able to without changes being required to the feedback system. In this manner, the effective operating range and/or performance of an existing feedback system can be increased without making hardware changes to the feedback system.

Some embodiments relate to an active vibration-isolation system comprising an intermediate mass, a feedback motion sensor having a first sensitivity and arranged to sense motion of the intermediate mass, a feedforward motion sensor having a second sensitivity that is less than the first sensitivity and configured to sense motion of a base that supports the intermediate mass, an actuator arranged to drive the intermediate mass relative to the base, and a control circuit configured to process signals from the feedback motion sensor and the feedforward motion sensor and output a signal to drive the actuator to reduce unwanted vibrational motion of the intermediate mass.

Some embodiments relate to methods of providing vibration isolation for a payload at an installation site. A method can comprise acts of determining that vibrational levels at the installation site saturate signals received from one or more feedback motion sensors mounted on an intermediate mass of an active vibration-isolation system, wherein the active vibration-isolation system comprises an actuator arranged to drive the intermediate mass relative to a base, and a control circuit configured to receive signals from the one or more feedback motion sensors and output one or more drive signals to drive the at least one actuator. A method of providing vibration isolation can further comprise acts of providing signals from one or more feedforward motion sensors mounted on the base to the control circuit; processing the signals from the one or more feedforward motion sensors with the control circuit; and driving the actuator in response to the processed signals from the one or more feedforward motion sensors to reduce motion of the intermediate mass induced by motion of the base such that signals received from one or more feedback motion sensors do not saturate.

The foregoing summary is provided by way of illustration and is not intended to be limiting. The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

The skilled artisan will understand that the figures, described herein, are for illustration purposes only. It is to be understood that in some instances various aspects of the embodiments may be shown exaggerated or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Aspects, embodiments, and features of the present teachings can be more fully understood from the following description in conjunction with the accompanying drawings.

DETAILED DESCRIPTION

The scientific research communities and the microfabrication, medical, nanotechnology, optics, and semiconductor industries continue to develop challenging demands for vibration isolation of precision instruments used in research and commercial settings. Vibration isolation typically requires suppression of dynamic forces (typically from external sources) that would otherwise act upon and perturb a precision instrument and impair its performance. To obtain proper operation and improved performance of some precision in instruments, it may be necessary to suppress unwanted motion of an instrument to the sub-micron or even sub-100-nm level.

The inventors have recognized and appreciated that precision instruments can be located in a wide variety of environments where there may be few or multiple sources causing the unwanted motion. Some sources can be external to the precision instrument, and some sources can originate internally to the precision instrument. In some cases, dynamic forces that perturb a precision instrument can be external to the instrument, couple into the instrument (e.g., through a base support, feed lines, and/or acoustic coupling to the equipment), and cause unwanted motion of the instrument.

One approach to providing vibration isolation at sites with widely different noise sources where passive vibration isolation may not be sufficient is to employ an active vibration-isolation system. An active vibration-isolation system can include one or more motion sensors and one or more feedback systems. A motion sensor can be arranged to sense motion in at least one degree of freedom of a structure that supports the precision instrument, and the feedback system can be arranged to electromechanically drive the structure to oppose any motion induced by noise sources. For example, the feedback system can include one or more actuators that are driven by one or more feedback signals to oppose motion of the structure that is induced by noise sources.

Often, to achieve better performance, an active vibration-isolation system can be tailored to the payload that it will support and to the environment in which it will be located. For example, an engineer may first perform a site visit to characterize the noise environment. Data collected during the site visit can be used during the manufacture of the active vibration-isolation system to tune the active vibration-isolation system (e.g., set gain and noise filter parameters for a feedback loop in the active vibration-isolation system) to accommodate the noise environment. In some cases, the tuning can be done electronically by adjusting gain values and filter settings in software code, for example, without changing system hardware. In this manner, an existing active vibration-isolation system can accommodate different noise environments without changing system hardware. Changing system hardware would undesirably add to system cost and could cause delays in manufacturing.

Figure 1:
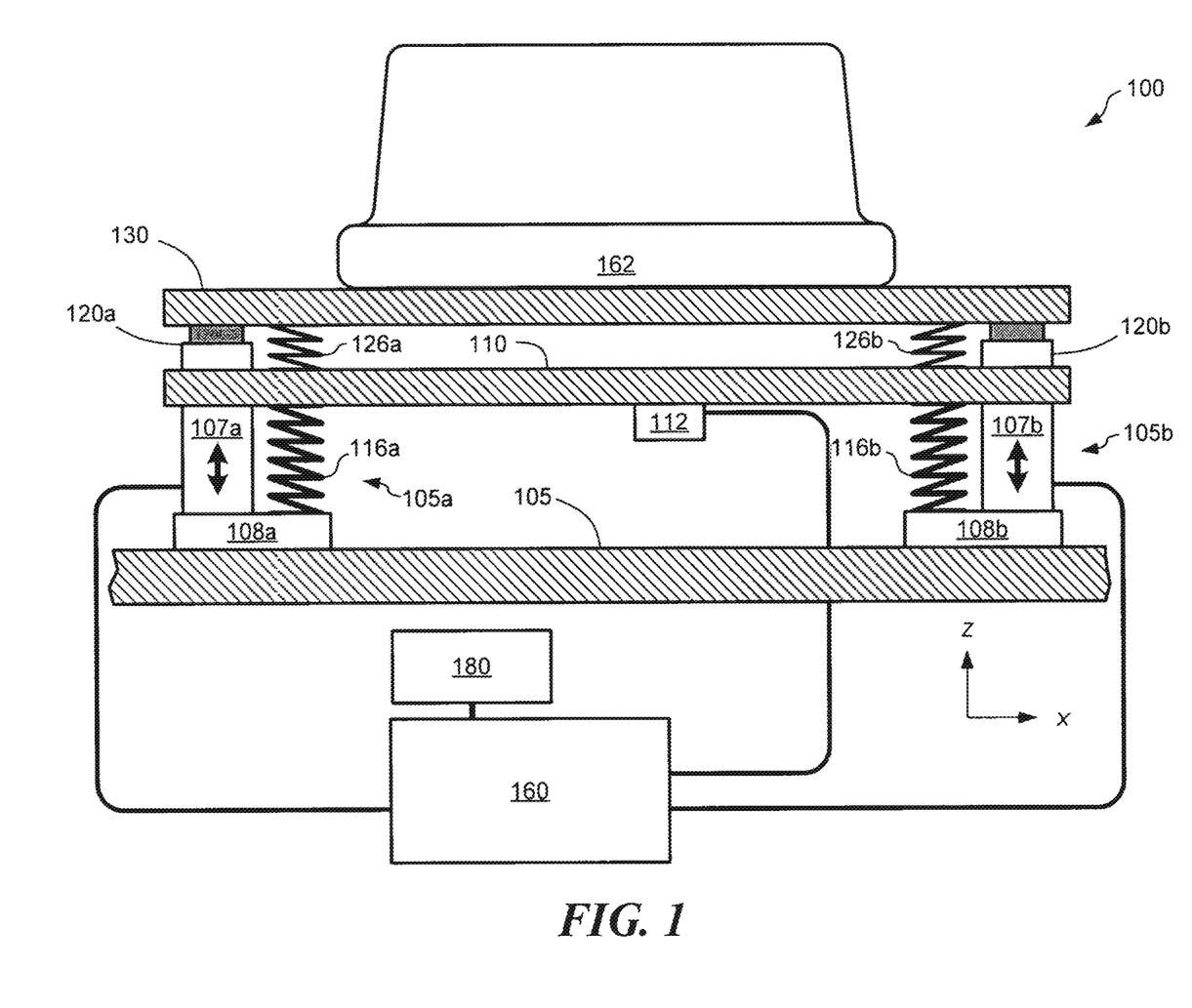
FIG. 1 depicts an active vibration-isolation system, according to some embodiments.

FIG. 1 depicts a simplified diagram of an active vibration-isolation system 100 that employs a feedback loop, according to some embodiments. In some embodiments, an active vibration-isolation system 100 can comprise an intermediate mass 110 that is supported above a base 105 by plural isolation assemblies 105a, 105b. One or more motion sensors 112 can be mounted on the intermediate mass to sense motion of the intermediate mass in one or more directions (e.g., in the z direction for the embodiment depicted in FIG. 1, though x and y directions may be sensed with additional sensors in other embodiments). In some cases, a single multi-axis sensor (e.g., a multi-axis geophone or accelerometer) can sense motion of the intermediated mass in two or more directions. Output from the motion sensor(s) can be provided to control circuit 160 that processes the signal(s) and provides drive signals to actuators 107a, 107b in the isolation assemblies 105a, 105b to oppose and reduce sensed motion. The actuators 107a, 107b can be arranged to drive the intermediate mass 110 relative to the base 105. Such feedback control operates to reduce unwanted motion of the intermediate mass 110. An active vibration-isolation system 100 can further include support structure (e.g., payload support 130) with passive vibration isolation (e.g., dampers 120a, 120b, and springs 126a, 126b) located above the intermediate mass that supports a payload 162. In some cases, the payload 162 can be a precision instrument, examples of which are given above.

Although only two isolation assemblies 105a, 105b are shown in the drawing of FIG. 1, an active vibration-isolation system 100 can include three or more isolation assemblies arranged between an intermediate mass 110 and the base 105. In some embodiments, there can be isolation assemblies configured to provide vibration isolation in multiple directions (e.g., in the x and/or y directions and arranged between the intermediate mass 110 and side walls or posts extending up from the base 105), and not only the z direction as depicted in FIG. 1.

In some cases, the isolation assemblies can be configured to provide isolation against perturbations that would otherwise affect pitch, roll, and/or yaw of the intermediate mass 110. For example, two or three motion sensors places at different locations on the intermediate mass 110 can detect pitch, roll, and/or yaw of the intermediate mass 110 and produce feedback signals that can be processed by the control circuit 160 to drive actuators to cancel the detected pitch, roll, and/or yaw. As just an example of roll, a first sensor near a first isolation assembly 105a may detect a different z motion of the intermediate mass 110 than is detected by a second sensor near a second isolation assembly 105b. In response to the differences in detected z motion (indicating roll of the intermediate mass 110), the control circuit can drive a first actuator 107a differently than a second actuator 107b to cancel the roll.

In some embodiments, isolation assemblies can include offload springs and actuators. For example, a first isolation assembly 105a can comprise an offload spring 116a and actuator 107a. In some implementations, the offload springs 116a, 116b can have a greater stiffness than the actuators 107a, 107b, such that the offload springs carry most or all of the weight of the payload 162, intermediate mass 110, and supporting structure above the intermediate mass 110. Examples of systems in which the offload springs have greater stiffness than the actuators are described in U.S. Pat. Nos. 8,899,393 and 9,353,824 which are incorporated herein by reference in their entirety. In such implementations, the actuator can comprise a soft actuator such as a voice coil driver.

In some embodiments, the offload springs 116a, 116b may not be present or can have a stiffness less than the actuators 107a, 107b, such that the actuators carry most or all of the weight of the payload 162, intermediate mass 110, and supporting structure above the intermediate mass 110. Examples of systems in which the offload springs have less stiffness than the actuators are described in U.S. Pat. No. 5,660,255 which is incorporated herein by reference in its entirety. In such implementations, the actuator can comprise a stiff actuator such as a piezoelectric actuator.

The intermediate mass 110 can be formed from any suitable material, such as aluminum, stainless steel, or a combination thereof, though other materials can be used in some embodiments. Although FIG. 1 shows one intermediate mass 110 that spans plural isolation assemblies 105a, 105b, in some cases each isolation assembly can have its own intermediate mass which is not connected to the intermediate mass of all other isolation assemblies. In such cases, one or more motion sensors 112 can be mounted on each isolation assembly's intermediate mass to sense motion in one or more directions. Each isolation assembly can support separated regions of a payload 162. In some cases, each isolation assembly can be controlled by a same feedback loop for a given direction, such that the isolation assemblies operate in parallel from a common actuator drive signal. In some cases, each isolation assembly can be controlled by different feedback loops for a given direction, such that the isolation assemblies operate in parallel from different actuator drive signals. When each isolation assembly is controlled by a different feedback loop and the isolation assemblies are separated, cancellation of pitch, roll, and/or yaw can occur automatically and need not be separately sensed and accounted for.

The base 105 can comprise any suitable material, such as aluminum, stainless steel, or a combination thereof, though other materials can be used. In some implementations, the base 105 can comprise a floor, table or other structure located at a facility, and may not be included as part of a manufactured vibration-isolation system 100. In such implementations, an isolation assembly 105a can be provided as a separately packaged assembly that is configured to mount between the payload 162 and base 105.

According to some implementations, level adjusters 108a, 108b can be included with an isolation assembly to adjust the levelness of the intermediate mass 110 and/or the payload 162. A level adjuster 108a, for example, can comprise a threaded drive assembly that is coupled to an actuator 107a and can be rotated (manually and/or automatically) to adjust a height of an actuator 107a, 107b above a base 105. In some cases, a level adjuster can further adjust the height of an offload spring 116a above the base 105.

According to some embodiments, a motion sensor 112 can comprise an accelerometer or geophone, for example, and can output at least one signal representative of motion in one direction (e.g., the z direction) to control circuit 160. Other types of motion sensors (e.g., strain-gauge sensors, microelectromechanical sensors, gyrometers, optical interferometric sensors, etc.) can also be used, and the invention is not limited to only accelerometers and geophones. In multi-axis vibration-isolation systems, one or more motion sensors 112 can output motion signals representative of motion in two or more directions (for example, any combination of x, y, z, pitch, roll, and yaw). Control circuit 160 can be configured to process signals from the motion sensor(s) 112 and output drive signals to the actuators 107a, 107b that drive the intermediate mass 110 in a manner to oppose motion sensed by the motion sensor. Some examples of feedback control that may be included in control circuit 160 are described in connection with FIGS. 1, 2, 4, 18, 19, and 22 in U.S. Pat. No. 5,823,307 and in connection with FIG. 4 in U.S. Pat. No. 7,726,452, both of which are incorporated herein by reference. The control circuit 160 can include passive, active, analog, and/or digital circuit components, and can include processing electronics (e.g., logic components, a microcontroller, a microprocessor, a field-programmable gate array, an application-specific integrated circuit, a digital signal processor, or some combination thereof) adapted to perform feedback cancellation of unwanted motion as described herein and in the sections of the aforementioned U.S. patents.

A user interface 180 can be in communication with the control circuit 160, according to some embodiments, and can be configured to receive user input and indicate a stability of operation of the vibration-isolation system 100. A user interface can comprise a touch screen, a touch panel, a graphical user interface, mechanical knobs, buttons, toggles, or switches, indicator lights, an imaging display, or some combination thereof. In some implementations, a user interface 180 comprises a personal computer or smartphone that communicates with control circuit through a wireless or wired communication link. A custom software application can be executing on the personal computer or smartphone that allows communication with and reconfiguration of software elements executing on processing electronics of control circuit 160.

According to some embodiments, a payload support 130 can be supported over the intermediate mass 110 by additional support springs 126a, 126b. Also, dampers 120a, 120b can be added between the payload support 130 and the intermediate mass 110 to dampen motion of the payload support. In some embodiments, there can be three or more sets of support springs 126a, 126b and dampers 120a, 120b. In some cases, level adjusters 108a, 108b can be included between the payload support 130 and the intermediate mass 110 for levelling the payload support 130 and/or payload 162. In some implementations, the payload 162 can be mounted directly on a single payload support 130 that spans plural support springs 126a, 126b and dampers 120a, 120b as shown. In other implementations, the payload support 130 may not span plural support springs and dampers. Instead, separate payload support plates can be located at each support spring and damper and support a portion of the payload 162. In some cases, the support springs 126a, 126b and dampers 120a, 120b can connect directly to separated locations on the payload 162 and a payload support or payload support plates may not be used The inventors have recognized and appreciated that some installment locations can exceed the limits of existing or premanufactured vibration-isolation systems, such as those described in connection with FIG. 1. Such installment locations can be high-level floors (e.g., above the 3$^{rd}$ floor) in large, steel-structure buildings (e.g., buildings spanning more than 500 meters on a side). In such locations, the floor vibrations can be so large that the feedback loop in the vibration-isolation system cannot be closed and operate properly to significantly reduce all unwanted motion of the payload, or may not be able to provide enough reduction in vibration to meet a specification for a precision instrument even though the feedback loop may otherwise be operating properly.

The inventors have discovered that a problem can arise with the sensors 112 mounted on the intermediate mass in a noisy environment. Typically, the motion sensors 112 are very sensitive so that they can detect motion at the sub-micron level. For large-amplitude vibrations, the motion sensors 112 can become nonlinear in their response. For example, they can output a signal that saturates (rolls over and/or flattens) at high vibration levels. The nonlinear behavior of the sensors 112 may not provide correct motion-sensing signals that can be accommodated properly by the feedback loop, resulting in undesirable performance of the vibration-isolation system 100.

Because an existing active vibration-isolation system 100 can be manufactured and tuned for its sensors 112, changing the feedback sensors 112 may entail retuning feedback circuitry and possibly changing additional hardware components in the active vibration-isolation system 100. As described above, such changes can be costly and lead to manufacturing delays. In some cases, an active vibration-isolation system 100 may already be installed at a location and previously performed satisfactorily. However, noise conditions at the installation site may have increased over time to exceed the range of the active vibration-isolation system 100. Instead of redesigning or replacing an existing active vibration-isolation system 100, it would be preferable to use the active vibration-isolation system 100 in a noisier environment than it is originally configured to detect correctly, and reduce the effects of environmental noise to a level where the active vibration-isolation system 100 can function properly.

Figure 2:
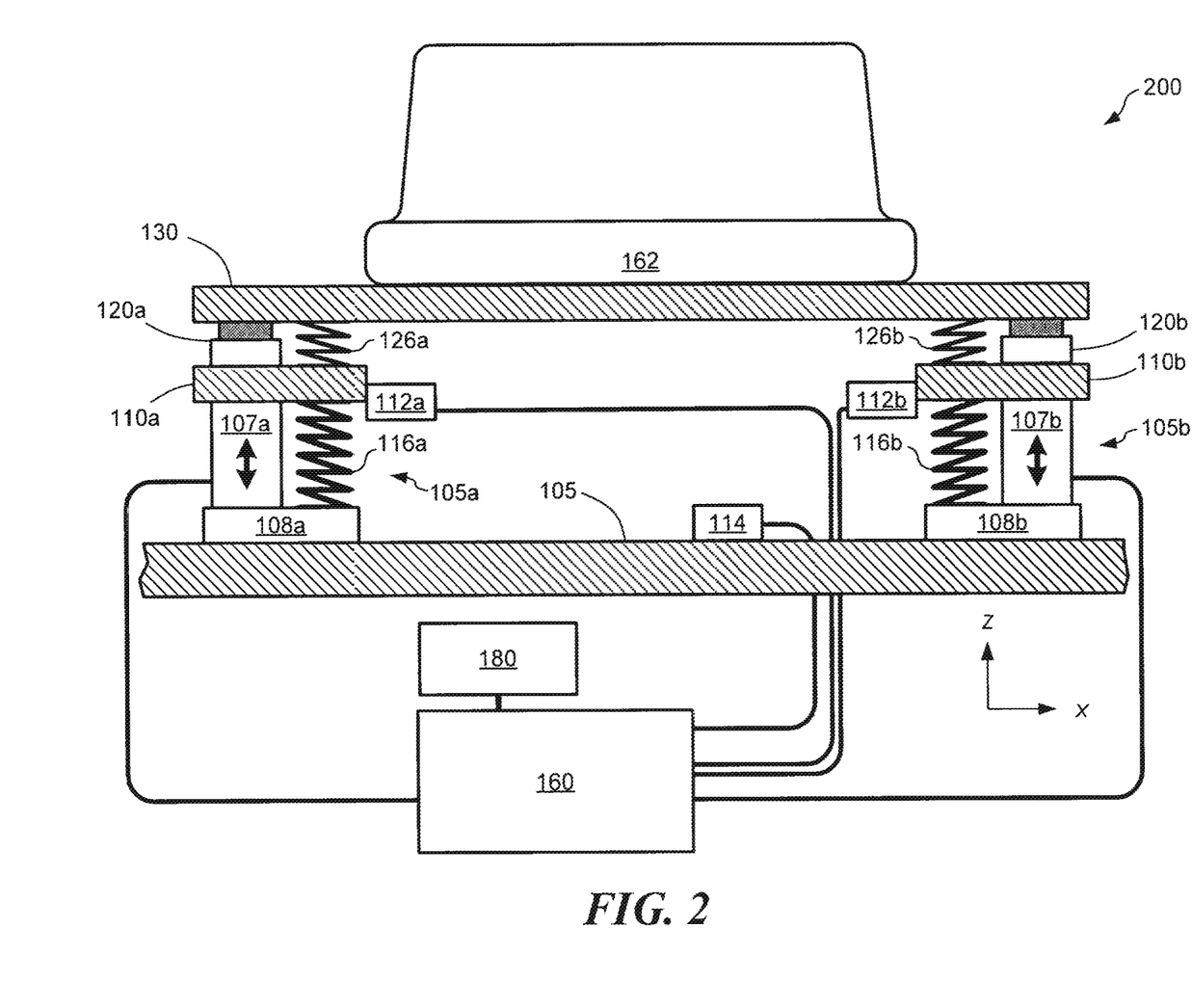
FIG. 2 depicts an active vibration-isolation system that includes feedforward assistance, according to some embodiments.

FIG. 2 depicts an active vibration-isolation system 200 having at least one feedback loop that is assisted by feedforward control. In some embodiments, one or more feedforward motion sensors 114 can be mounted on a base 105 (e.g., a floor) that supports the active vibration-isolation system 200. The one or more feedforward motion sensor 114 can sense motion of the base 105 in one or more directions. A feedforward motion sensor 114 can be of a same type or different type than a feedback motion sensor 112, but can be made less sensitive than motion sensor 112 so that its output signal does not saturate in the noisy environment in which the active vibration-isolation system 200 is located. In some embodiments, the sensitivity of feedforward motion sensor 114 is between a factor of 1.5 and 30 less than a sensitivity of feedback motion sensor 112. The sensitivity of the motion sensors may be measured in terms of volts or current output per sensed unit of motion (e.g., volts per micron). By having a lower sensitivity, the feedforward motion sensor 114 can detect larger amounts of vibrational motion than the feedback motion sensor 112 without saturating. Accordingly, the feedforward motion sensor 114 may saturate at higher vibrational-motion levels than the feedback motion sensor 112. In some cases, the sensitivity of the feedforward motion sensor 114 can be approximately the same as the sensitivity of the feedback motion sensor 112.

A signal from a feedforward motion sensor 114 can be provided to control circuit 160. Control circuit 160 can process the signal received from the feedforward motion sensor 114 and output a feedforward drive signal to one or more actuators 107a, 107b to oppose motion of the intermediate masses 110a, 110b that would be induced by the motion sensed by the feedforward motion sensor 114. For example, if feedforward motion sensor 114 senses floor motion in the +z direction, the control circuit 160 can output a feedforward drive signal to actuators 107a, 107b to move the intermediate masses in the −z direction. In some implementations, the signal(s) from the base-mounted feedforward motion sensor(s) 114 can be processed separately from the signal(s) received from the intermediate-mass-mounted feedback sensor(s) 112.

The embodiment depicted in FIG. 2, shows a separate intermediate mass 110a, 110b as part of each isolation assembly 105a, 105b. In such cases, each isolation assembly can be packaged as a support unit. An isolation assembly 105a can further include a support spring 126a and damper 120a. In some cases, each isolation assembly can further include a separate payload support (instead of there being a single payload support 130), such that the isolation assembly can be positioned under a portion of an instrument 162 or platform on which the instrument rests.

In some cases, the signal(s) from the base-mounted motion feedforward sensor(s) 114 can be limited to a particular bandwidth for which vibrations of the base 105 are most pronounced. For example, signal(s) from the base-mounted motion feedforward sensor(s) 114 can be filtered by a bandpass filter. A bandwidth of the bandpass filter (measured as full-width-half-maximum) may approximately match or be larger than a bandwidth of frequencies (measured as full-width-half-maximum) from the base 105 that induce the largest motion of the intermediate masses 110a, 110b. If the base 105 exhibits a single frequency or small cluster of frequencies that is/are responsible for inducing the largest motion of the intermediate masses 110a, 110b, then the bandpass filter can be essentially centered at that frequency and may have a bandwidth that is significantly larger than the frequency or cluster of frequencies. In some implementations, a bandpass filter can have a FWHM value between 20% and 50% of a center frequency value, where a narrower bandwidth is used at lower frequencies. For example, a FWHM value for a disturbance centered at 5 Hz may be 1 Hz, and a FWHM value for a disturbance centered at 100 Hz may be 50 Hz. In some embodiments, a bandpass filter can be embodied as a software filter implemented in control circuit 160. In some cases, a bandpass filter can be embodied as a circuit. In some cases, multiple filters can be used to pass multiple disturbances located at different frequencies, and a combined bandpass of the multiple filters can be larger than 50% (e.g., up to 500%) of one of the disturbance frequencies. In some implementations, a filter can be implemented digitally to span a selected range of frequencies that can extend from DC to a frequency value that can be up to 5 times a highest frequency of a detected disturbance in a noise environment.

In operation, feedforward control provided by the base-mounted feedforward motion sensor(s) 114, control circuit 160, and actuators 107a, 107b can attenuate motion of the intermediate mass 110 induced by motion of the base to an extent that the more sensitive feedback sensor(s) 112 mounted on the intermediate mass do not exhibit nonlinear behavior or saturate. This can allow the system's feedback loop (comprising intermediate-mass-mounted sensor(s) 112, control circuit 160, and actuators 107a, 107b) to operate normally and provide adequate vibration isolation for the intermediate mass 110 and payload 162 in an installment location that would otherwise overwhelm a premanufactured active vibration-isolation system 100 and require a redesign of system hardware (e.g., replacement of motion sensors 112, replacement of actuators 107a, 107b).

The inventors have also found that the feedforward control can improve the performance (by at least a factor between 2 to 5) of an active vibration-isolation system 100 that operates under normal feedback control. For example, an active vibration-isolation system 100 that provides 20 dB attenuation of vibrations in the z direction of a payload 162 at a particular frequency (e.g., 2 Hz) can be improved by the addition of a z-direction feedforward motion sensor 114 and feedforward control as described above to provide 26 dB to 30 dB attenuation of vibrations in the z direction of the payload 162 at the same frequency in an environment that would otherwise overwhelm the active vibration-isolation system 100. Larger improvements in performance may also be obtained by adding feedforward control as described herein. In general, an active vibration-isolation system 200 that includes feedforward control can provide isolation (significant attenuation of vibrations) from external low-frequency dynamic forces over a range of frequencies that may extend from approximately 0.3 Hz to approximately 100 Hz. Additionally, passive damping components (such as support springs 126a, 126b and passive dampers 120a, 120b) of an active vibration-isolation system 200 system can provide isolation at frequencies above a natural resonance frequency of the system, for example into the multi-kilohertz frequencies.

Figure 3A:
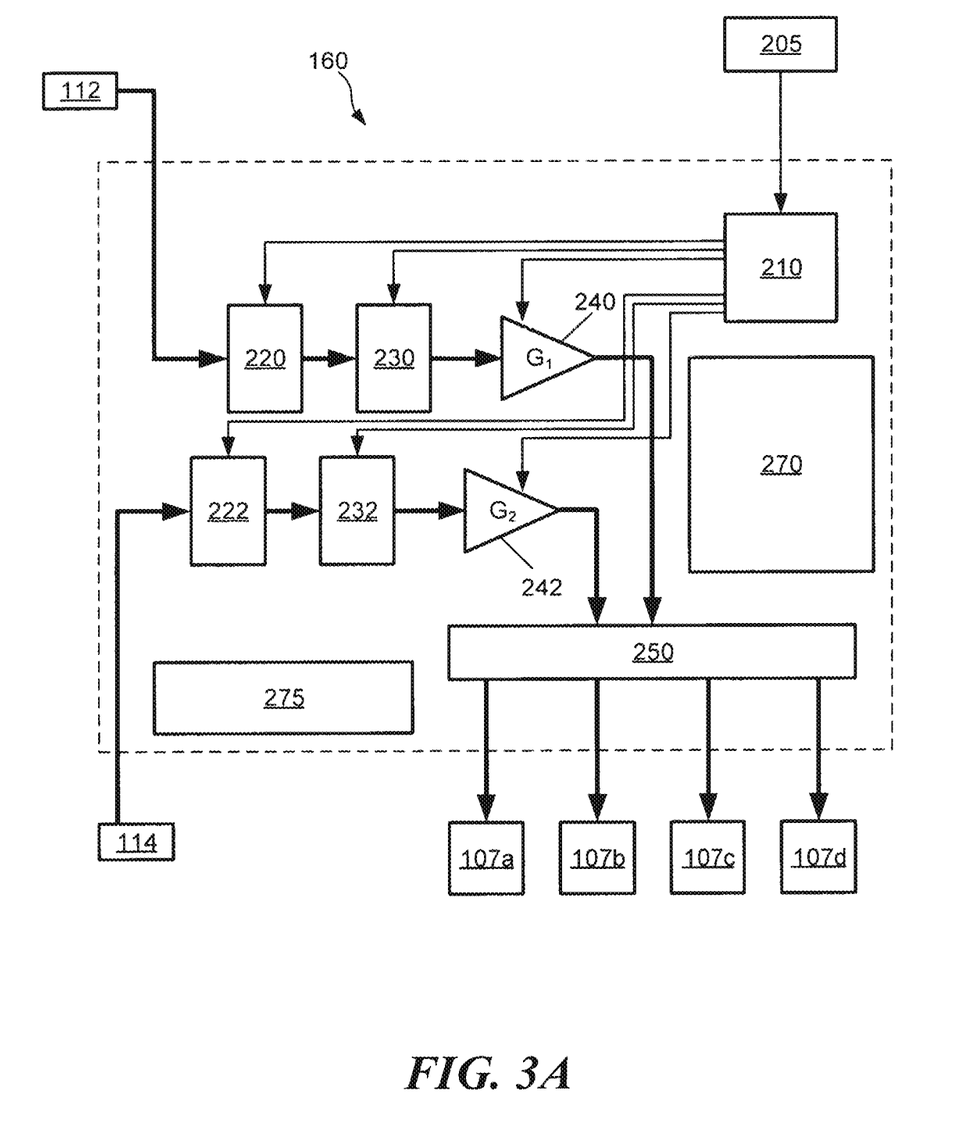
FIG. 3A depicts a control circuit for an active vibration-isolation system, according to some embodiments.

An example of a control circuit 160 for feedback control and feedforward assistance is depicted in FIG. 3A, though the invention is not limited to only the circuit configuration shown in the drawing. According to some embodiments, control circuit 160 can include at least one feedback circuit comprising a frequency filter 220, a phase adjuster 230, an amplifier 240, and a signal splitter 250. The frequency filter, phase adjuster, and amplifier can be arranged in a different order than is shown in the drawing, though at least one of these components can receive a signal from a motion sensor 112. Some embodiments may not include a frequency filter 220 and/or phase adjuster 230. In some cases, frequency filtering and/or phase adjustment functionality may be included in the amplifier 240. Some embodiments can comprise an integrator (not shown) in the feedback loop that contains the frequency filter 220, phase adjuster 230, and amplifier 240. In some embodiments, a parameter associated with an integration time constant for the integrator can be altered by a user-adjustable vibration-isolation setting. The signal splitter 250 can output plural signals to drive plural actuators 107a-107d connected to the intermediate mass 110. In some implementations, a same signal is applied to all actuators for a particular degree of freedom (e.g., applied to four actuators 107a-107d arranged to provide z-directed support to the intermediate mass 110 in FIG. 1). In some cases, a received feedback or feedforward signal or processed feedback or feedforward signal can be operated on by a processor 270 or passive components. In some cases, each actuator can have its own sensor 112 and feedback circuit, so that different signals are applied to the actuators 107a-107d, as described above.

Although four actuators are depicted in FIG. 3A, an active vibration-isolation system 200 can have fewer or more actuators that are controlled by control circuit 160. In some cases, there can be more than one control circuit 160 in a system 200. For example, some actuators in a system can be arranged to suppress vibrations in a first direction (e.g., a vertical direction), and be controlled by one control circuit, and some actuators in the system can be arranged to suppress vibrations in a second, different direction (e.g., a horizontal direction).

In further detail, the circuitry shown in FIG. 3A can provide active vibration-isolation control with feedforward assistance in at least one direction (e.g., the z direction referring to FIG. 2). The feedback motion sensor 112 can be configured on the intermediate mass 110 to sense motion in the z direction. The feedback circuitry can process the sensed z-directed motion and produce a control signal that is sent to the actuators 107a-107d that suppresses unwanted motion in the z direction. Some embodiments can include one or more additional feedback motion sensor(s) 112, additional filter(s) 220, additional phase adjuster(s) 230, additional amplifier(s) 240 and at least one additional actuator 107 for additional degrees of freedom (e.g., x, y, pitch, roll, yaw) for which vibration isolation control is desired. In some cases, each feedback circuit can operate independently of the other feedback circuits.

According to some embodiments, the frequency filter 220 can receive a signal from the feedback motion sensor 112 and can attenuate different spectral components of the received signal by different amounts. In some embodiments, a frequency filter 220 can include plural settable filter parameters that determine amounts of attenuation for different spectral bandwidths operated on by the frequency filter. For example, a filter parameter value can determine an attenuation value for one or more spectral bandwidths. Filter parameter values can be set over a range of frequencies from 0.01 Hz to 30 kHz, according to some embodiments. A frequency filter 220 can be implemented in hardware, software, or a combination thereof.

A phase adjuster 230 can alter the phases of (e.g., add signal delay to) one or more frequency components of a signal received from a feedback motion sensor 112. In some embodiments, a phase adjuster 230 can include plural settable phase parameters that determine amounts of phase adjustment over different spectral bandwidths. For example, a phase parameter value can determine an amount of signal delay added for a particular spectral bandwidth. A phase adjuster 230 can be implemented in hardware, software, or a combination thereof.

The amplifier 240 can comprise any suitable amplifier that amplifies a signal received from the feedback motion sensor 112 and provides an output signal to drive one or plural actuators of an active vibration-isolation system 200. According to some embodiments, an amplifier 240 can include one or more settable gain parameters that determine gain values for one or more spectral bandwidths operated on by the amplifier. In some embodiments, the amplifier can have a single settable gain value that is applied over the entire bandwidth of an amplified signal. In some cases, the amplifier 240 can be an inverting amplifier. A power gain value for an amplifier 240 can be between 1.5 and 5, according to some embodiments, though higher or lower values of gain in power are possible. In some embodiments, different gain values can be used for different degrees of freedom for which vibration is controlled. For example, different gain values can be used for active vibration-isolation control in the x, y, and z directions. In some implementations, additional gain may exist within a feedback circuit and the loop gain for a feedback circuit can have a value between 1.5 and 200. In some cases, a gain-lettable amplifier 240 can be included to adjust loop gain. An amplifier 240 can be implemented in hardware, software, or a combination thereof. In some implementations, an adjustable attenuator can be included in a feedback loop to adjust loop gain.

Control circuit 160 can also include a frequency filter 222, phase adjuster 232, and amplifier 242 that are used in parallel for feedforward control. The frequency filter 222, phase adjuster 232, and amplifier 242 can be the same as or similar to the frequency filter 220, phase adjuster 230, and amplifier 240 described above. In some cases, each isolation assembly 105a, 105b can have a dedicated feedforward control circuit. In other cases, a common feedforward control circuit can be used to control actuators in multiple isolation assemblies.

According to some embodiments, a feedforward signal output from a feedforward amplifier 242 can be added to a feedback signal output from a feedback amplifier 240, so that a combined feedback and feedforward signal is applied to one or more actuators. For example, a feedforward signal can be added to a feedback signal before or after being divided by signal splitter 250. In some implementations, a signal splitter may be configured to sum the feedforward signal and feedback signals at its input and then split the resulting combined signal for transmission to one or more actuators. In some embodiments, a feedforward signal can be added to a feedback signal before amplification, so that a combined feedback and feedforward signal can be amplified by a single amplifier and then applied to one or more actuators.

As used herein, a feedback signal is a signal derived from sensed motion of an intermediate mass 110 and applied reactively to oppose the sensed motion of the intermediate mass. A feedforward signal is a signal derived from sensed motion of a base 105 supporting the intermediate mass 110 and applied proactively to cancel anticipated motion of the intermediate mass due to the sensed motion of the base.

Control circuit 160 can further include a parameter setter 210 that is configured to receive a signal from an input control 205. The input control can comprise a portion of a user interface 180 (e.g., mechanical knob, toggle switch, pushbutton, or item on a graphical user interface), according to some embodiments. A user operating the input control 205 can select one of a plurality of "vibration-isolation" settings provided by the vibration-isolation system.

In some embodiments, control circuit 160 can also include a processor 270, which can be adapted with machine-readable code to execute some or all of the parameter setting, filtering, phase adjustment, and amplification functionality described above. Processor 270 can comprise logic circuitry, a microcontroller, a microprocessor, a digital signal processor, a field-programmable gate array, or some combination thereof. Control circuit 160 can further include a data storage device 275 (e.g., ROM and/or RAM type memory) that is in communication with the processor 270. The processor 270 can also communicate with the parameter setter 210 in some embodiments.

Although FIG. 3A depicts a single processor 270 in a control circuit 160 having feedback and floor feedforward assistance, the invention is not limited to a single processor 270. In some embodiments, there can be a dedicated processor for one or more control loops of each vibration-isolation assembly, or for a group of control loops implemented for two or n more vibration-isolation assemblies. For example, there can be a first dedicated processor for a first vibration-isolation assembly 105a that handles one or more of the x, y, z control loops for that assembly, a second dedicated processor for a second vibration-isolation assembly 105b, and so on for each vibration-isolation assembly in a vibration isolation system 200. Alternatively, there may be a first processor that handles all x control loops for some or all of the vibration-isolation assemblies in a system. In embodiments, the processors 270 can be in communication with each other. One of the processors, or a separate processor, can be configured to function as a master controller and may monitor and/or manage coordinated operations of the processors. An advantage of using multiple processors is that more complex filtering algorithms can be employed on each processor and run in parallel, instead of trying to handle multiple complex filtering, feedback, and/or feedforward algorithms simultaneously with a single processor. In some cases, a single processor may not have adequate processing power to handle multiple complex filtering, feedback, and/or feedforward algorithms simultaneously for a particular noise environment.

Figure 3B:
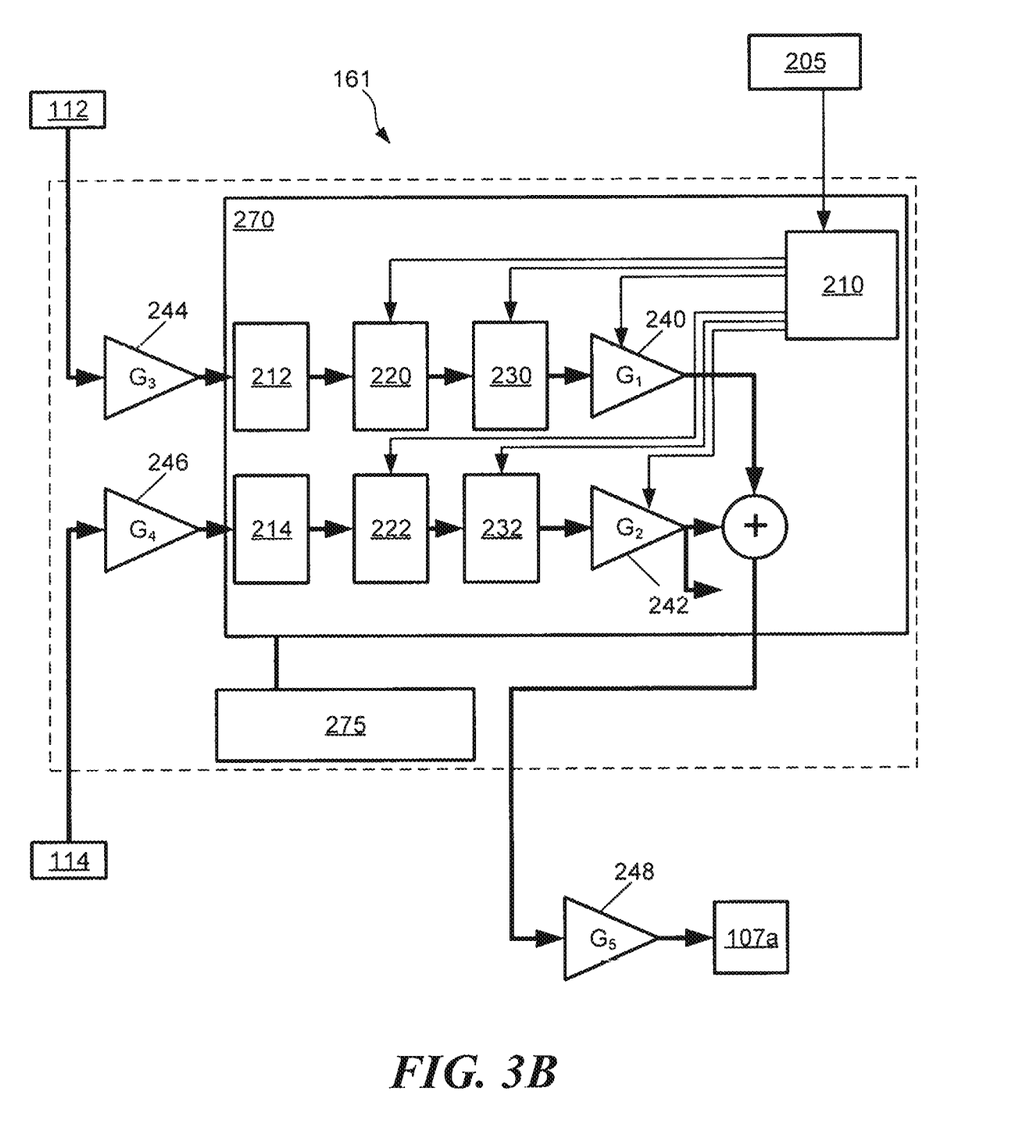
FIG. 3B depicts a control circuit for an active vibration-isolation system, according to some embodiments.

FIG. 3B depicts an embodiment of a control circuit 161 in which a number of components are implemented in software that executes on a processor 270. For example, frequency filters 220, 222, phase adjusters 230, 232, and amplifiers 240, 242 can be implemented in software to have the functionalities described above in connection with FIG. 3A. In some implementations, analog preamplifiers 244, 246 can be included to amplify signals from a feedback motion sensor 112 and a feedforward motion sensor 114, respectively. Outputs from the preamplifiers can be provided to analog-to-digital (A/D) converters 212, 214. In some cases, the A/D converters comprise hardware input circuits at signal input ports of the processor 270 that are configured to receive analog signals. Outputs from digital amplifiers 240, 242 can be summed together by the processor 270 and provided as a single output signal to a drive amplifier 248 that is configured to drive at least one actuator 107a. A drive amplifier 248 having fixed or adjustable gain $G_5$ can comprise a power hardware amplifier that provides enough current to drive actuator 107a.

The control circuit 161 depicted in FIG. 3B is illustrated as driving a single actuator. In such embodiments, there can be a separate control circuit for each actuator in an active vibration-isolation system 200. In some embodiments, a single feedforward sensor 114 can be used to sense motion of a base 105 in one direction: An output signal from the feedforward sensor 114 can be divided anywhere along the feedforward signal path prior to summation, and provided to one or more control circuits 161 that are arranged to drive other actuators. In some embodiments, the control circuit 161 depicted in FIG. 3B can be used to drive plural actuators by including a signal splitter 250, as illustrated in FIG. 3A, and additional drive amplifiers.

Figure 4:
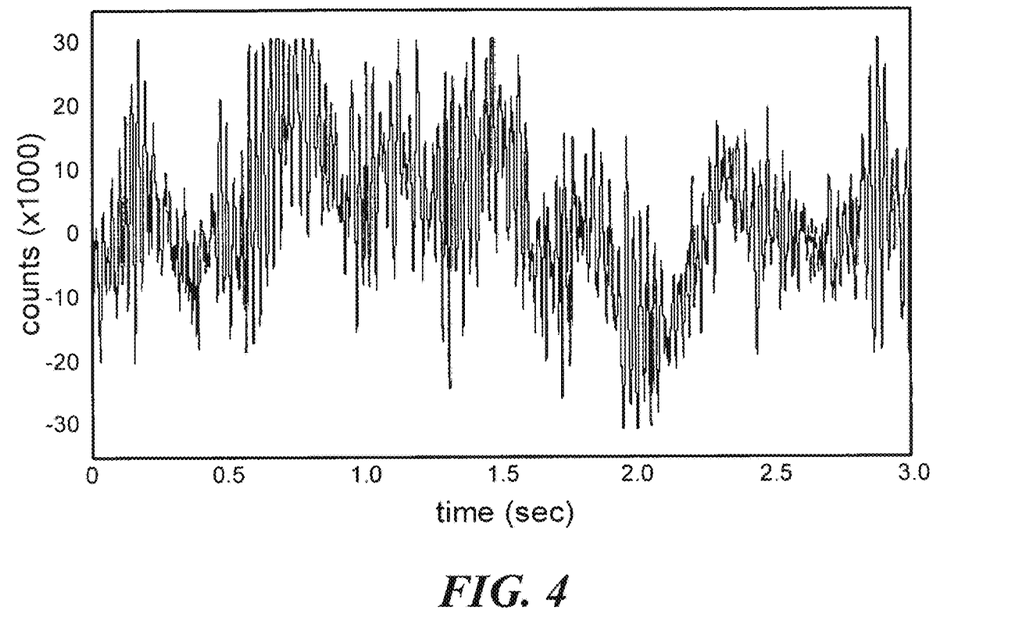
FIG. 4 depicts a plot of an example signal from a motion sensor in a first vibration-isolation system at a first installment location in which neither feedback nor feedforward control is employed.

The graph of FIG. 4 plots an example signal detected from a motion sensor 112 (geophone) in an active vibration-isolation system 200 similar to the system described in connection with FIG. 2 at a first installation site. The motion sensor 112 is configured to sense motion in a y direction at a first location on the active vibration-isolation system 200. Other sensors at multiple different locations on the system were also present to detect x, y and z-directed motion at more than one location on the system, but signals from these sensors are not plotted to simplify the graph. In some embodiments, there can be one or more motion sensors located at individual isolation assemblies 105a, 105b that each include an intermediate mass plate and that each support a payload at a different location. The signal plotted in the graph of FIG. 4 was obtained at an installment location when no feedback or feedforward control was activated in order to obtain a baseline characterization of vibration-induced motion of intermediate masses at the location. The trace indicates that signals from the motion sensors 112 can saturate at various times (exceed signal levels of ±30,000 counts). Vibration-induced motion of a precision instrument in this installment location would exceed the capability or working range of an active vibration-isolation system 100 that employs feedback control only, because it exceeds the linear range of the feedback motion sensors 112.

Figure 5:
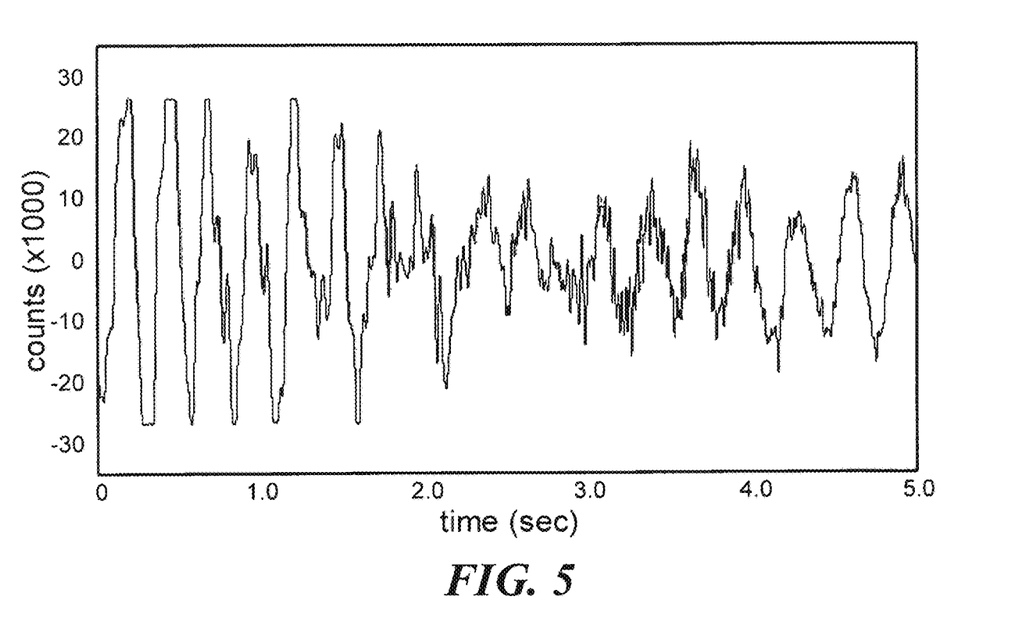
FIG. 5 depicts a plot of an example signal from the same motion sensor in the vibration-isolation system of FIG. 4 in which feedback control only is employed.

The graph in FIG. 5 plots an example signal detected from the feedback motion sensor 112 when feedback only is employed for the vibration-isolation system described in connection with FIG. 4. Active vibration isolation employing feedback only is initiated at about 2 seconds, and is not optimal. Large absolute motion (greater than ±15,000 counts) is still detected by the feedback motion sensor. These results indicate that feedback motion control alone may not be sufficient to adequately suppress externally-induced motion in some noisy environments.

Figure 6:
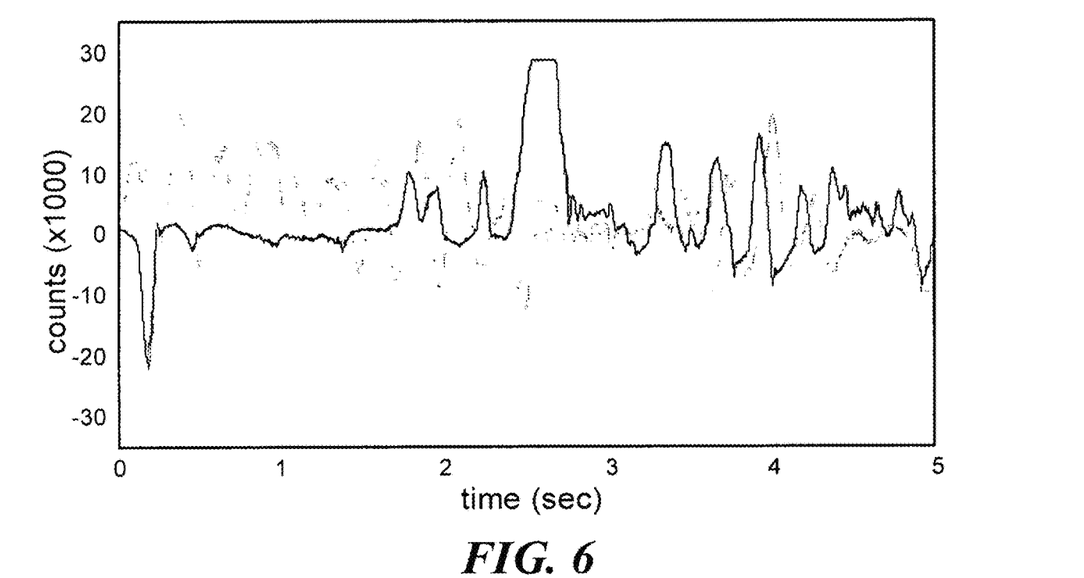
FIG. 6 depicts a plot of two example signals from two motion sensors in a second vibration-isolation system at a second installment location in which feedback control is employed.

The graph in FIG. 6 plots two example signals from two feedback motion sensors 112 in a second vibration-isolation system at a second installation site in which feedback only is employed. The second vibration-isolation system is essentially the same as the first vibration-isolation system, although the environmental noise differs. Although there is less higher-frequency noise and improved feedback control compared to the case in FIG. 5, there are random large disturbances in the environment that can saturate the feedback motion sensors 112, such as the disturbance of an intermediate mass 110 detected by an x-sensor 112 at approximately 2.5 seconds. A signal from a y-sensor 112 is also plotted in the graph of FIG. 6. Again in this environment, detected deviations of the intermediate mass can exceed 15,000 counts when only feedback control is employed.

Figure 7:
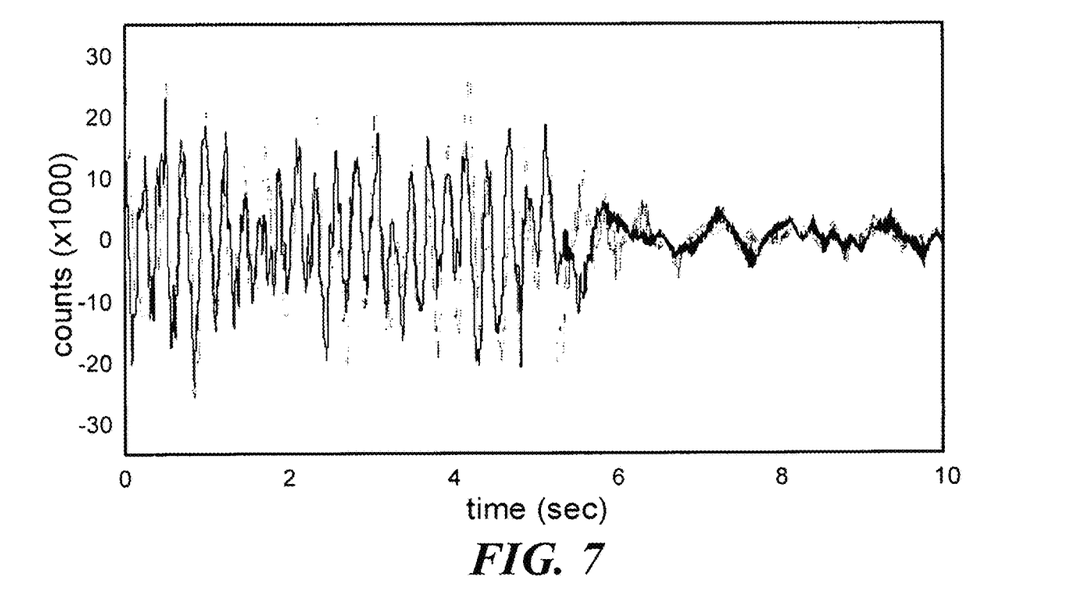
FIG. 7 depicts a plot of two example signals from the same motion sensors in the vibration-isolation system of FIG. 6 in which feedback and floor-assisted feedforward control is employed.

FIG. 7 plots example signals from the same two motion sensors 112 in the system of FIG. 6. For the case of FIG. 7, both feedback and floor feedforward control is employed as described above. In this example, floor feedforward is turned on at approximately 5 seconds and added to the feedback control already in operation. The conditions are otherwise essentially the same as those for FIG. 6. With the assistance of floor feedforward control, the active vibration-isolation system 200 can provide adequate attenuation of vibrations without failing. Deflection of the intermediate mass by amounts greater than 30,000 counts can be suppressed to less than 5,000 counts, an overall reduction by more than a factor of 6. Even compared with the feedback-only case shown in FIG. 6, the improvement can be at least a factor of 4.

Embodiments include methods of operating active vibration-isolation systems that are described above. An example method can include acts of installing an active vibration-isolation system having a feedback sensor at an installation site that has a vibration noise level that exceeds the range of vibration that can be cancelled by the active vibration-isolation system. The method can include providing a feedforward motion sensor having a sensitivity that is less than the feedback sensor to detect motion of a base of the active vibration-isolation system, and providing signals from the feedforward motion sensor to actuators of the active vibration-isolation system to reduce the effects of the vibration noise level to a range that can be compensated for by feedback control of the active vibration-isolation system.

Another example method can include acts of receiving a feedforward signal from a feedforward motion sensor mounted on a base of an active vibration-isolation system, wherein the vibration-isolation system is installed at a location where vibrational noise levels exceed a working range of a feedback circuit of the vibration-isolation system. The method can further include processing the feedforward signal in parallel with a feedback signal received from a feedback sensor mounted on an intermediate mass of the active vibration-isolation system, and applying a drive signal based at least on the feedforward signal to an actuator of the active vibration-isolation system so as to reduce the effects of the vibrational noise levels to a range that can be compensated for by feedback control of the active vibration-isolation system.

Vibration-isolation apparatus described herein can be embodied in various configurations. Example configurations include combinations of configurations (1) through (12) as described below.

(1) An active vibration-isolation system comprising an intermediate mass; a feedback motion sensor having a first sensitivity and arranged to sense motion of the intermediate mass; a feedforward motion sensor having a second sensitivity that is less than the first sensitivity and configured to sense motion of a base that supports the intermediate mass; an actuator arranged to drive the intermediate mass relative to the base; and a control circuit configured to process signals from the feedback motion sensor and the feedforward motion sensor and output a drive signal to drive the actuator to reduce unwanted vibrational motion of the intermediate mass.

(2) The active vibration-isolation system of configuration (1), wherein without the application of a signal from the feedforward motion sensor to the control circuit, vibrational levels at an installation site of the active the vibration-isolation system saturate signals from the feedback motion sensor.

(3) The active vibration-isolation system of configuration (1) or (2), wherein the control circuit is arranged to: process a signal from the feedback motion sensor in parallel with a signal from the feedforward motion sensor; and sum the processed signals from the feedback motion sensor the feedforward motion sensor to produce the drive signal.

(4) The active vibration-isolation system of configuration (3), wherein the control circuit comprises a first signal path that receives a signal from the feedback motion sensor, the first signal path including: a first signal filter; a first phase adjuster; and a first amplifier.

(5) The active vibration-isolation system of configuration (4), further comprising an analog-to-digital converter in the first signal path, wherein the signal filter, the phase adjuster, and the amplifier are implemented as software that executes on a processor.

(6) The active vibration-isolation system of configuration (4) or (5), wherein the control circuit comprises a second signal path that receives a signal from the feedback motion sensor, the second signal path including: a second signal filter; a second phase adjuster; and a second amplifier.

(7) The active vibration-isolation system of any one of configurations (1) through (6), further comprising an isolation assembly that includes: the actuator; and an offload spring arranged to support the intermediate mass.

(8) The active vibration-isolation system of configuration (7), wherein the isolation assembly further comprises the intermediate mass and a level adjuster.

(9) The active vibration-isolation system of configuration (8), wherein the isolation assembly further comprises: a payload support; a payload support spring coupled between the payload support and the intermediate mass; and a damper coupled in parallel with the payload support spring between the payload support and the intermediate mass.

(10) The active vibration-isolation system of any one of configurations (7) through (9), wherein the offload spring is sized to support approximately all of the weight of a payload that acts on the isolation assembly at an installation site, such that the actuator supports essentially no weight of the payload.

(11) The active vibration-isolation system of any one of configurations (1) through (10), wherein the actuator is a voice coil motor.

(12) The active vibration-isolation system of any one of configurations (1) through (11), further comprising: a first isolation assembly that includes the actuator and the control circuit; a first processor in the control circuit adapted to process the signals from the feedback motion sensor and the feedforward motion sensor; a second isolation assembly that includes: a second actuator arranged to drive a second intermediate mass relative to the base; and a second control circuit configured to process second signals from a second feedback motion sensor and the feedforward motion sensor and output a second drive signal to drive the second actuator to reduce unwanted vibrational motion of the second intermediate mass; and a second processor in the second control circuit adapted to process, in parallel with the first processor, the second signals from the second feedback motion sensor and the feedforward motion sensor.

Methods of operating vibration-isolation apparatus of the foregoing configurations include different combinations of acts as described in methods (13) through (17) below.

(13) A method of providing vibration isolation for a payload at an installation site, the method comprising acts of: determining that vibrational levels at the installation site saturate signals received from one or more feedback motion sensors mounted on an intermediate mass of an active vibration-isolation system, wherein the active vibration-isolation system comprises: an actuator arranged to drive the intermediate mass relative to a base; and a control circuit configured to receive signals from the one or more feedback motion sensors and output one or more drive signals to drive the actuator; providing signals from one or more feedforward motion sensors mounted on the base to the control circuit; processing the signals from the one or more feedforward motion sensors with the control circuit; and in response to the processed signals from the one or more feedforward motion sensors, driving the actuator to reduce motion of the intermediate mass induced by motion of the base such that signals received from one or more feedback motion sensors do not saturate.

(14) The method of (13), wherein the one or more feedforward motion sensors saturate at first vibrational levels that are higher than second vibrational levels at which the one or more feedback motion sensors saturate.

(15) The method of (13) or (14), further comprising supporting approximately all weight of the intermediate mass and a weight of the payload acting on the intermediate mass with an offload spring that is coupled in parallel with the actuator between the intermediate mass and the base.

(16) The method of (15), wherein the actuator and intermediate mass are part of a first isolation assembly that supports a portion of the weight of the payload and the active vibration-isolation system includes additional isolation assemblies that assist in supporting the weight of the payload.

(17) The method of any one of (13) through 16), wherein vibration isolation is provided in more than one direction.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Unless stated otherwise, the terms "approximately" and "about" are used to mean within ±20% of a target dimension in some embodiments, within ±10% of a target dimension in some embodiments, within ±5% of a target dimension in some embodiments, and yet within ±2% of a target dimension in some embodiments. The terms "approximately" and "about" can include the target dimension. The term "essentially" is used to mean within ±3% of a target dimension.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

What is claimed is:

1. An active vibration-isolation system comprising:
   an intermediate mass;
   a feedback motion sensor having a first sensitivity and arranged to sense motion of the intermediate mass;
   a feedforward motion sensor having a second sensitivity that is less than the first sensitivity and configured to sense motion of a base;
   an actuator arranged to drive the intermediate mass relative to the base, wherein the base is arranged to support at least the actuator and the intermediate mass; and
   a control circuit or processor configured to process signals from the feedback motion sensor and the feedforward motion sensor and output a drive signal to drive the actuator to reduce unwanted vibrational motion of the intermediate mass.

2. The active vibration-isolation system of claim 1, wherein without application of a signal from the feedforward motion sensor to the control circuit or processor, vibrational levels at an installation site of the active the vibration-isolation system saturate signals from the feedback motion sensor when the active vibration-isolation system is in operation.

3. The active vibration-isolation system of claim 1, wherein the control circuit or processor is arranged to:
   process a signal from the feedback motion sensor in parallel with a signal from the feedforward motion sensor; and
   sum the processed signals from the feedback motion sensor and the feedforward motion sensor to produce the drive signal.

4. The active vibration-isolation system of claim 3, wherein the control circuit or processor comprises a first signal path that receives a signal from the feedback motion sensor, the first signal path including:
   a first signal filter;
   a first phase adjuster; and
   a first amplifier.

5. The active vibration-isolation system of claim 4, further comprising an analog-to-digital converter in the first signal path, wherein the first signal filter, the first phase adjuster, and the first amplifier are implemented as software that executes on the processor.

6. The active vibration-isolation system of claim 4, wherein the control circuit or processor comprises a second signal path that receives a signal from the feedforward motion sensor, the second signal path including:
a second signal filter;
a second phase adjuster; and
a second amplifier.

7. The active vibration-isolation system of claim 1, further comprising an isolation assembly that includes:
the actuator; and
an offload spring arranged to support at least the intermediate mass and coupled between the base and the intermediate mass.

8. The active vibration-isolation system of claim 7, wherein the isolation assembly further comprises:
the intermediate mass; and
a level adjuster.

9. The active vibration-isolation system of claim 8, wherein the isolation assembly further comprises:
a payload support;
a payload support spring coupled between the payload support and the intermediate mass; and
a damper coupled in parallel with the payload support spring between the payload support and the intermediate mass.

10. The active vibration-isolation system of claim 7, wherein the offload spring is sized to support approximately all of the weight of a payload that acts on the isolation assembly at an installation site, such that the actuator supports essentially no weight of the payload.

11. The active vibration-isolation system of claim 1, wherein the actuator is a voice coil motor.

12. The active vibration-isolation system of claim 1, further comprising:
a first isolation assembly that includes the actuator and the control circuit or processor;
a second isolation assembly that includes:
a second actuator arranged to drive a second intermediate mass relative to the base; and
a second control circuit or processor configured to process second signals from a second feedback motion sensor and the feedforward motion sensor and output a second drive signal to drive the second actuator to reduce unwanted vibrational motion of the second intermediate mass.

13. A method of providing vibration isolation for a payload at an installation site, the method comprising:
determining that vibrational levels at the installation site saturate first signals received from one or more feedback motion sensors mounted on an intermediate mass of an active vibration-isolation system, wherein the active vibration-isolation system comprises:
an actuator arranged to drive the intermediate mass relative to a base; and
a control circuit configured to receive second signals from the one or more feedback motion sensors and output one or more drive signals to drive the actuator;
providing third signals from one or more feedforward motion sensors mounted on the base to the control circuit;
processing the third signals from the one or more feedforward motion sensors with the control circuit; and
in response to the processed third signals from the one or more feedforward motion sensors, driving the actuator to reduce motion of the intermediate mass induced by motion of the base such that the second signals received from the one or more feedback motion sensors do not saturate.

14. The method of claim 13, wherein the one or more feedforward motion sensors saturate at first vibrational levels that are higher than second vibrational levels at which the one or more feedback motion sensors saturate.

15. The method of claim 13, further comprising supporting approximately all weight of the intermediate mass and a weight of the payload acting on the intermediate mass with an offload spring that is coupled in parallel with the actuator between the intermediate mass and the base.

16. The method of claim 15, wherein the actuator and intermediate mass are part of a first isolation assembly that supports a portion of the weight of the payload and the active vibration-isolation system includes additional isolation assemblies that assist in supporting the weight of the payload.

17. The method of claim 13, wherein vibration isolation is provided in more than one direction.

18. The method of claim 13, wherein the one or more feedback motion sensors include at least one preamplifier.

19. The method of claim 13, wherein the one or more feedforward motion sensors include at least one preamplifier.

20. The active vibration-isolation system of claim 1, wherein the feedback motion sensor includes a preamplifier.

21. The active vibration-isolation system of claim 1, wherein the feedforward motion sensor includes a preamplifier.

22. The active vibration-isolation system of claim 1, wherein the actuator is a piezoelectric actuator.

23. The active vibration-isolation system of claim 1, further comprising the base.

* * * * *